United States Patent [19]
Keseleski et al.

[11] 3,911,113
[45] Oct. 7, 1975

[54] RECRYSTALLIZATION PROCESS FOR THE PURIFICATION OF NYSTATIN

[75] Inventors: Adam John Keseleski, Edison; Gerd Wilhelm Michel, Princeton, both of N.J.

[73] Assignee: E. R. Squibb & Sons, Inc., Princeton, N.J.

[22] Filed: Jan. 23, 1973

[21] Appl. No.: 325,966

[52] U.S. Cl. .............................. 424/123; 424/120
[51] Int. Cl.² ........................................ A61K 35/00
[58] Field of Search .......................... 424/123, 120

[56] References Cited
UNITED STATES PATENTS

| | | |
|---|---|---|
| 2,865,807 | 12/1958 | Dutcher et al .................... 424/123 |
| 3,509,255 | 4/1970 | Mendelsohn ....................... 424/123 |

*Primary Examiner*—Albert T. Meyers
*Assistant Examiner*—Daren M. Stephens
*Attorney, Agent, or Firm*—Lawrence S. Levinson; Merle J. Smith; Donald J. Barrack

[57] ABSTRACT

Crude, partially purified, or contaminated nystatin is purified by suspending the nystatin starting material in a solvent mixture of a water-miscible lower alkanol, water, and a solubilizing agent, solubilizing the nystatin, removing insoluble impurities, diluting the solution with water and adjusting the pH of the solution to cause precipitation of amorphous (or partially crystalline) nystatin, heating the resulting suspension to convert the amorphous nystatin to a crystalline product, and recovering the crystalline nystatin.

11 Claims, No Drawings

RECRYSTALLIZATION PROCESS FOR THE PURIFICATION OF NYSTATIN

BACKGROUND OF THE INVENTION

The present invention relates to the antibiotic nystatin (referred to in the older literature as fungicidin), and more specifically to a process for the purification of crude, partially purified or contaminated nystatin.

Nystatin and its method of preparation from Streptomyces noursei are disclosed by Hazen et al in U.S. Pat. No. 2,797,183. Reference may also be made to Hazen and Brown, "Fungicidin, An Antibiotic Produced by a Soil Actinomycete," Proc. Soc. Exptl. Biol. Med. 76:93 (1950) and Brown, Hazen and Mason, "Effect of Fungicidin (nystatin) in Mice Injected with Lethal Mixtures of Aureomycin and *Candida albicans*," Science 117:609 (1953). The antibiotic is hereinafter referred to by the single term "nystatin".

Several methods for isolating mystatin from the fermentation media are known to the prior art. Examples of such processes are Hazen et al, U.S. Pat. No. 2,797,183; Vandeputte et al, U.S. Pat. No. 2,786,781; Vandeputte et al, U.S. Pat. No. 3,332,844; and Renella, U.S. Pat. No. 3,517,100. The nystatin isolatad by known processes is not a highly purified, uniformly crystalline product. A method for obtaining nystatin in such a form is of course highly desirable, and several methods for achieving this result have been suggested by the prior art, but each has certain drawbacks. For examples of such processes, reference may be made to Vandeputte, U.S. Pat. No. 2,832,719; Dutcher et al, U.S. Pat. No. 2,865,807; Mendelsohn, U.S. Pat. No. 3,509,255; and Esse, U.S. Pat. No. 3,517,101.

BRIEF SUMMARY OF THE INVENTION

It is an object of this invention to provide a process for the purification of nystatin that is operable at high concentrations of the active component, thus avoiding the necessity for the handling of large quantities of solvent and/or the need for the concentration of solvent-rich mixtures which may result in partial inactivation of the antibiotic.

It is an object of this invention to provide a process for the purification of nystatin that is easily controllable under conditions of large-scale commercial operations.

It is an object of this invention to provide a process for the purification of nystatin which utilizes inexpensive and commercially available materials.

It is an object of this invention to provide a process for the purification of nystatin which results in the spontaneous formation of crystalline nystatin without the need for the addition of crystallization-promoting agents (e.g. seed crystals) or extended aging periods for completion of the crystallization.

It is an object of this invention to provide a process for the purification of nystatin which yields a crystalline product of high purity and high potency.

The purification process of this invention meets the objectives outlined above. It is carried out by:

i. suspending the crude, partially purified, or contaminated mystatin in a solvent mixture of a water-miscible lower alkanol, water, and a solubilizing agent;

ii. solubilizing the crude nystatin by adjusting the pH of the suspension;

iii. removing insoluble impurities from the mixture;

iv. adding water to the clarified solution and adjusting the pH of the solution to cause precipitation of an amorphous, or partially crystalline, nystatin;

v. heating the resulting suspension to convert the amorphous nystatin to crystalline nystatin; and vi. recovering the purified crystalline nystatin.

DETAILED DESCRIPTION OF THE INVENTION

The nystatin employed as the starting material in the novel purification process of this invention may include crude, partially purified, or contaminated nystatin. The expression "contaminated nystatin" is meant to include not only nystatin that contains chemical contaminants, but is also meant to include physical contaminants such as dirt particles, fibrous material, and other particulate elements that might cause nystatin to be unacceptable for pharmaceutical utility.

The first step of the process of this invention is the suspending of the nystatin starting material in a solvent mixture of a water-miscible lower alkanol, water, and a solubilizing agent. The water-miscible lower alkanols are well known; they include methanol, ethanol, n-propanol, isopropanol, and tert-butanol. The use of methanol or ethanol is preferred. As a solubilizing agent a glycol, glycol ether, or glycol ether derivative may be used. The solubilizing agent may be represented by the general formula

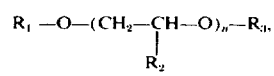

wherein n is an integer of from 1 to 3; $R_1$ may be hydrogen, lower alkyl, aralkyl, or lower alkanoyl; $R_2$ may be hydrogen or lower alkyl; and $R_3$ may be hydrogen, lower alkyl or lower alkanoyl.

By lower alkyl is meant a straight or branched chain hydrocarbon radical having up to seven carbon atoms, e.g. methyl, ethyl, propyl, isopropyl, butyl, isobutyl, t-butyl, pentyl, hexyl, 4,4-dimethylpentyl, heptyl, etc.

By aralkyl is meant a lower alkyl group, as defined above, substituted with a mono- or bicarbocyclic aromatic ring system having from 6 to 10 carbon atoms, e.g. benzyl, phenethyl, etc.

By lower alkanoyl is meant an acyl group derived from a lower alkanoic acid. A lower alkanoic acid is one having from 2 to 8 carbon atoms, e.g. acetic acid, propionic acid, caprylic acid, etc. Of the lower alkanoyl groups, acetyl is preferred.

Examples of solubilizing agents which may be used in the process of this invention are listed in Table I.

Table I

| Solvent | Formula |
|---|---|
| Ethylene glycol | $HOC_2H_4OH$ |
| Diethylene glycol | $HO(C_2H_4O)_2H$ |
| Triethylene glycol | $HO(C_2H_4O)_3H$ |
| Propylene glycol | $CH_3CH(OH)CH_2OH$ |
| 2-Methoxyethanol | $CH_3OC_2H_4OH$ |
| 2-Ethoxyethanol | $C_2H_5OC_2H_4OH$ |
| 2-Propoxyethanol | $C_3H_7OC_2H_4OH$ |
| 2-Butoxyethanol | $C_4H_9OC_2H_4OH$ |
| 2-Benzyloxyethanol | $C_6H_5CH_2OC_2H_4OH$ |
| α-Methylbenzyloxyethanol | $CH_3C_6H_5CH_2OC_2H_4OH$ |
| Diethylene glycol monomethyl ether | $CH_3O(C_2H_4O)_2H$ |
| Diethylene glycol monoethyl ether | $C_2H_5O(C_2H_4O)_2H$ |
| Diethylene glycol monobutyl ether | $C_4H_9O(C_2H_4O)_2H$ |
| 1-Methoxy-2-propanol | $CH_3OCH_2CH(CH_3)OH$ |
| 1-Propoxy-2-propanol | $C_3H_7OCH_2CH(CH_3)OH$ |
| Ethylene glycol dimethyl ether | $CH_3OC_2H_4OCH_3$ |

Table I-Continued

| Solvent | Formula |
|---|---|
| Diethylene glycol dimethyl ether | $CH_3O(C_2H_4O)_2CH_3$ |
| Diethylene glycol diethyl ether | $C_2H_5O(C_2H_4O)_2C_2H_5$ |
| Triethylene glycol dimethyl ether | $CH_3O(C_2H_4O)_3CH_3$ |
| Ethylene glycol monoacetate | $HOC_2H_4OCOCH_3$ |
| Ethylene glycol monomethyl ether acetate | $CH_3OC_2H_4OCOCH_3$ |
| Ethylene glycol monoethyl ether acetate | $C_2H_5OC_2H_4OCOCH_3$ |
| Ethylene glycol monobutyl ether acetate | $C_4H_9OC_2H_4OCOCH_3$ |
| Triethylene glycol monomethyl ether acetate | $CH_3O(C_2H_4O)_3COCH_3$ |
| Ethylene glycol diacetate | $CH_3COOC_2H_4OCOCH_3$ |

Nystatin may be suspended in the solvent mixture (lower alkanol, water, and solubilizing agent) by adding the nystatin while agitating the mixture. The solvent mixture used in the process of this invention effectively dissolves nystatin in the acidic pH range, particularly the pH range of from about 2.0 to about 4.5, while at the same time acting as a very poor solvent for the impurities normally associated with crude or partially purified nystatin which has been isolated from the whole harvest broth of *Streptomyces noursei*. The same solvent mixture may, upon dilution with water, be readily converted into a solvent mixture in which, by contrast, nystatin is substantially insoluble at pH of from about 4.0 to about 8.0, thus providing for easy recovery of the purified product.

It is expedient to utilize only as much of the solubilization agent in the solvent mixture as is needed to accomplish a complete dissolution of the nystatin. More of the solubilization agent can be used, but it is not necessary. The volume ratio of solvent employed in the solvent mixture affects the ease of product crystallization and the ease of final product recovery. The volume ratio of alkanol: solubilizing agent may be from about 4:1 to about 1:1, preferably from about 2.5:1 to about 1.5:1 and most preferably about 2:1. The volume ratio of alkanol:water may be from about 10:1 to about 50:1, preferably from about 15:1 to about 25:1, and most preferably about 20:1.

The second step of the process of this invention is the solubilization of the nystatin. This is accomplished by adjusting the pH of the suspension of nystatin in the solvent mixture to from about 2.0 to about 4.5, preferably from about 3.0 to about 3.5, by addition of a dilute acid. The nature of the acid is not critical; any acidic material that is soluble in the solvent mixture may be used to lower the pH. Examples of acids which may be used in this invention are hydrochloric acid, sulfuric acid, phosphoric acid, malonic acid and citric acid.

Removal of insoluble impurities from the resulting acidified mixture is the third process step. The clarification may be carried out using procedures well known to the art. Centrifugation and filtration are preferred means of clarification. A suitable clarifying aid, e.g. activated charcoal, and/or a filter aid, e.g. diatomaceous silica, may be used in this operation, if desired.

After clarification, the solution is diluted with water. The amount of water used to dilute the solution is not critical; an amount of water equal to 0.2 to 5 times the volume of the solution, preferably 0.5 to 1.5 times the volume of the solution is used. The water used to dilute the solution may be chilled, but chilling is not necessary for the successful operation of the process of this invention. The pH of the diluted solution is adjusted to within the range of from about 4.0 to about 8.0, preferably within the range of from about 6.5 to about 7.5 with a suitable base. The nature of the base used is not critical; any alkaline material that is soluble in the diluted solution may be used. Sodium hydroxide, trimethylamine, triethylamine, and triethanolamine are exemplary of bases that may be used in the process of this invention. The pH adjustment results in the precipitation of amorphous (or partially crystalline) nystatin from the solution; a suspension of nystatin is obtained.

Conversion of the amorphous (or partially crystalline) nystatin to a crystalline product is achieved by heating the suspension of nystatin at a temperature of from about 40°C to about 60°C, preferably from about 45°C to about 55°C; it is preferred that the suspension be agitated while it is being heated. The heating and agitation usually need only be carried on for a period of less than 1 minute to about 1 hour. It is a surprising discovery, and an essential feature of this invention, that the diluted solvent mixture (comprising alkanol, water, and glycol, glycol ether, or glycol ether derivative) is an excellent medium for the transformation of an amorphous suspension of nystatin into a uniformly crystalline product by simply heating of the suspension of nystatin. Optionally, the heating may be carried out in the presence of a salt, e.g. sodium chloride. The presence of relatively small amounts of salts (i.e. amounts of salt on the order of approximately 1 to 10 grams of salt per 100 million units of activity (as measured by biological assay) may be advantageous in accelerating the transformation of amorphous nystatin to crystalline nystatin.

To insure complete crystallization of the nystatin, the slurry obtained in the heating step may be cooled. The nystatin is then recovered by conventional means, e.g. centrifugation or filtration, and then dried. Optionally the crystalline nystatin may be washed with a suitable solvent prior to drying. Examples of suitable solvents are water, acetone, ethanol, etc.

All conventional operations of the process of this invention, e.g. solubilization, clarification, and dilution may be carried out at a temperature of from about 5°C to about 40°C, preferably within the range of from about 12°C to about 25°C.

The following examples are illustrative of the process of this invention.

EXAMPLE 1

A 10 gram portion of crude nystatin having a potency of 4,960 units/milligram by microbiological assay is suspended with agitation in a solvent mixture comprising 130 milliliters of methanol, 64 milliliters of 2-methoxyethanol and 6 milliliters of water, while the temperature of the mixture is maintained at 12°C to 15°C. The pH of the resulting suspension is adjusted to 3.5 by the gradual addition of 3 N hydrochloric acid over a period of approximately 10 minutes. Agitation is continued for another 15 minutes during which time the nystatin essentially dissolves as is indicated by a gradual clarification of the dispersion. Under continued agitation, 2 grams of diatomaceous silica is added to the mixture and the resulting slurry is filtered to remove any residual solids. The clear, yellow colored filtrate is cooled to 10°C to 12°C under mild agitation, and 270 milliliters of chilled (10°C) distilled water is slowly added to the solution over a period of 5 to 10 minutes while maintaining a temperature range of between 10°C and 12°C.

The pH of the diluted filtrate is adjusted to 7.1 by dropwise addition of triethylamine. As soon as the pH reaches the range of approximately 4.0 to 4.5, amorphous nystatin begins to precipitate and forms a light-yellow colored suspension of the finely dispersed product. 2.4 Grams of sodium chloride is added to the mixture, and the pH is readjusted to 7.1, if necessary, with either dilute hydrochloric acid or triethylamine. The suspension is quickly heated, under efficient agitation, to 45°C and this temperature is maintained until crystallization of the product takes place. On completion of the crystallization, after a holding time of approximately 5 minutes at 45°C, the resulting crystal slurry is cooled to approximately 5°C and held at this temperature for 2 hours.

The crystalline product is collected by filtration, washed successively with two 20 milliliter portions of chilled (10°C) distilled water and two 20 milliliter portions of acetone, and is dried under vacuum. Crystalline nystatin is obtained in a yield of 94%; the product has a potency of 5,640 units/milligram by microbiological assay.

EXAMPLE 2

A 25 gram portion of crude nystatin having a potency of 4,727 units/milligram by microbiological assay is dispersed with agitation in a mixture comprising 350 milliliters of methanol, 135 milliliters of 2-ethoxyethanol and 15 milliliters of water at a temperature of 20°C. The pH of the resulting suspension is adjusted to 3.5 by slow addition of 3N sulfuric acid over a period of 15 minutes, during which time the nystatin substantially dissolves; stirring is continued for another 15 minutes at 20°C to assure complete dissolution of the nystatin. 5 Grams of diatomaceous silica is added to the mixture, and the resulting suspension is clarified by filtration. The clear, yellow colored filtrate is cooled to 15°C and 750 ml of chilled (10°C) distilled water is added, under mild agitation, over a period of 10 minutes.

The pH of the diluted mixture is adjusted to 7.0 by dropwise addition of triethanolamine to precipitate an amorphous, light-yellow colored product. While agitation is continued, 6 grams of sodium chloride is added to the resulting suspension and the mixture is quickly heated to 54°C to 56°C. Within a period of 10 to 12 minutes, at this temperature, nystatin crystals are being formed, and heating is continued for another 10 minutes to complete the crystallization of the product. The resulting crystal slurry is cooled to approximately 5°C over a period of 30 minutes and held at this temperature for 10 hours.

The crystalline nystatin is filtered, washed with two 100 milliliter portions of chilled (10°C), distilled water and dried under vacuum to give the final product in 83% recovery; the nystatin obtained has a potency of 5,420 units/milligram by microbiological assay.

EXAMPLE 3

The procedure described in Example 2 is repeated with the following exceptions: (a) 10 grams of a starting material with a potency of 4,865 units/milligram is used, (b) 3N hydrochloric acid is employed as the acidification agent, (c) the acidified mixture is treated for 10 minutes with 2 grams of activated carbon prior to filtration, and (d) triethylamine serves as the neutralization agent. Under these conditions, crystallization of the final product takes place within less than 10 minutes at a temperature of 49°C to 50°C. The yield of dried, crystalline nystatin is 88%; the product has a potency of 5,410 units/milligram by microbiological assay.

What is claimed is:

1. A process for the purification of nystatin which comprises:
   i. suspending nystatin in a solvent mixture comprising a water-miscible lower alkanol, water, and a solubilizing agent; said solubilizing agent having the formula

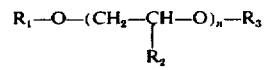

wherein $n$ is 1, 2, or 3, $R_1$ is hydrogen, lower alkyl, aralkyl, or lower alkanoyl, $R_2$ is hydrogen or lower alkyl, and $R_3$ is hydrogen, lower alkyl or lower alkanoyl; and wherein the volume ratio of alkanol to solubilizing agent is from about 4:1 to about 1:1 and the volume ratio of alkanol to water is from about 10:1 to about 50:1;
   ii. adjusting the pH of the suspension to between about 2.0 and about 4.5 to solubilize the nystatin and yield a solution;
   iii. removing insoluble impurities from the solution;
   iv. diluting the solution with water and adjusting the pH of the diluted solution to between about 4.0 and 8.0 to cause precipitation of amorphous nystatin and formation of a suspension;
   v. heating the suspension to convert amorphous nystatin to crystalline nystatin; and
   vi. recovering the crystalline nystatin.

2. A process in accordance with claim 1 wherein the pH of the suspension of nystatin in the solvent mixture is adjusted to from about 3.0 to about 3.5 to solubilize the nystatin and yield a solution.

3. A process in accordance with claim 1 wherein the insoluble impurities are removed from solution by filtration or centrifugation.

4. A process in accordance with claim 1 wherein the pH of the diluted solution is adjusted to from about 6.5 to about 7.5 to cause precipitation of amorphous nystatin and formation of a suspension.

5. A process in accordance with claim 1 wherein conversion of amorphous nystatin to crystalline nystatin is achieved by heating at a temperature of between about 40°C and about 60°C.

6. A process in accordance with claim 1 wherein recovery of crystalline nystatin is accomplished by centrifugation or filtration.

7. A process in accordance with claim 1 wherein the solvent mixture comprises methanol, water, and 2-methoxyethanol.

8. A process in accordance with claim 1 wherein the solvent mixture comprises methanol, water, and 2-ethoxyethanol.

9. A process in accordance with claim 1 for the purification of nystatin which comprises:
   i. suspending nystatin in a solvent mixture comprising a water-miscible lower alkanol, water, and a solubilizing agent, said solubilizing agent having the formula

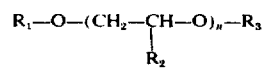

wherein $n$ is 1, 2, or 3, $R_1$ is hydrogen, lower alkyl, aralkyl, or lower alkanoyl, $R_2$ is hydrogen or lower alkyl, and $R_3$ is hydrogen, lower alkyl or lower alkanoyl;
  ii. adjusting the pH of the suspension to from about 3.0 to 3.5 to solubilize the nystatin and yield a solution;
  iii. removing insoluble impurities from the solution;
  iv. diluting the solution with water and adjusting the pH of the diluted solution to from about 6.5 to about 7.5 to cause precipitation of amorphous nystatin and formation of a suspension;
  v. heating the suspension to from about 45°C to about 55°C to convert amorphous nystatin to crystalline nystatin; and
  vi. recovering the crystalline nystatin.

10. A process in accordance with claim 1 wherein the volume ratio of alkanol to solubilizing agent is from about 2.5:1 to about 1.5:1 and the volume ratio of alkanol to water is from about 15:1 to about 25:1.

11. A process in accordance with claim 1 wherein the volume ratio of alkanol to solubilizing agent is about 2:1 and the volume ratio of alkanol to water is about 20:1.

* * * * *